United States Patent
Zhang et al.

(10) Patent No.: US 9,542,196 B2
(45) Date of Patent: Jan. 10, 2017

(54) COMMUNICATION TERMINAL AND METHOD FOR PROVIDING CONFIGURATION DATA FOR A MODEM WITH SYSTEM BOOT FIRMWARE

(71) Applicant: Intel Corporation, Santa Clara, CA (US)

(72) Inventors: Andrew Zhang, Portland, OR (US); Karunakara Karu Kotary, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 209 days.

(21) Appl. No.: 14/192,917

(22) Filed: Feb. 28, 2014

(65) Prior Publication Data

US 2015/0248296 A1    Sep. 3, 2015

(51) Int. Cl.
*G06F 9/00* (2006.01)
*G06F 15/177* (2006.01)
*G06F 9/44* (2006.01)

(52) U.S. Cl.
CPC .......... *G06F 9/4401* (2013.01); *G06F 9/4411* (2013.01)

(58) Field of Classification Search
CPC ....................................................... G06F 9/44
See application file for complete search history.

(56) References Cited

U.S. PATENT DOCUMENTS

| | | | | |
|---|---|---|---|---|
| 5,517,646 A | * | 5/1996 | Piccirillo | G06F 13/4072 710/10 |
| 5,878,221 A | * | 3/1999 | Szkopek | H04L 12/6418 370/488 |
| 6,141,706 A | * | 10/2000 | Thornton | G06F 9/4416 710/21 |
| 6,453,024 B1 | * | 9/2002 | Baker | H04M 11/06 375/222 |
| 7,383,432 B1 | * | 6/2008 | Barnes | G06F 21/55 713/151 |
| 2003/0031235 A1 | * | 2/2003 | Kim | H04B 1/3816 375/147 |
| 2004/0157630 A1 | * | 8/2004 | Monroe | H04M 3/323 455/466 |
| 2007/0022232 A1 | * | 1/2007 | Bhakta | H04M 1/0202 710/62 |
| 2011/0191484 A1 | * | 8/2011 | Babbar | G06F 9/5011 709/228 |
| 2013/0019110 A1 | * | 1/2013 | Lee | H04L 63/0823 713/193 |
| 2013/0282951 A1 | * | 10/2013 | Kuo | G06F 21/575 711/102 |
| 2014/0056150 A1 | * | 2/2014 | Cho | H04L 43/028 370/241 |

* cited by examiner

*Primary Examiner* — Mohammed Rehman
(74) *Attorney, Agent, or Firm* — Viering, Jentschura & Partner mbB

(57) ABSTRACT

A communication terminal is described comprising a modem; a first memory configured to store configuration data for the modem; a second memory configured to store a system boot firmware; and a processor configured to execute the system boot firmware and to read the configuration data from the memory and provide it for the modem under the control of the system boot firmware.

18 Claims, 11 Drawing Sheets

COMMUNICATION TERMINAL AND METHOD FOR PROVIDING CONFIGURATION DATA FOR A MODEM WITH SYSTEM BOOT FIRMWARE

TECHNICAL FIELD

Embodiments described herein generally relate to communication terminals and methods for providing configuration data for a modem.

BACKGROUND

The start-up time for a mobile device such as a mobile phone or a tablet computer should typically as low as possible to be convenient for the user. Therefore, approaches to reduce the start-up time of mobile devices at low cost are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

Figure 1:
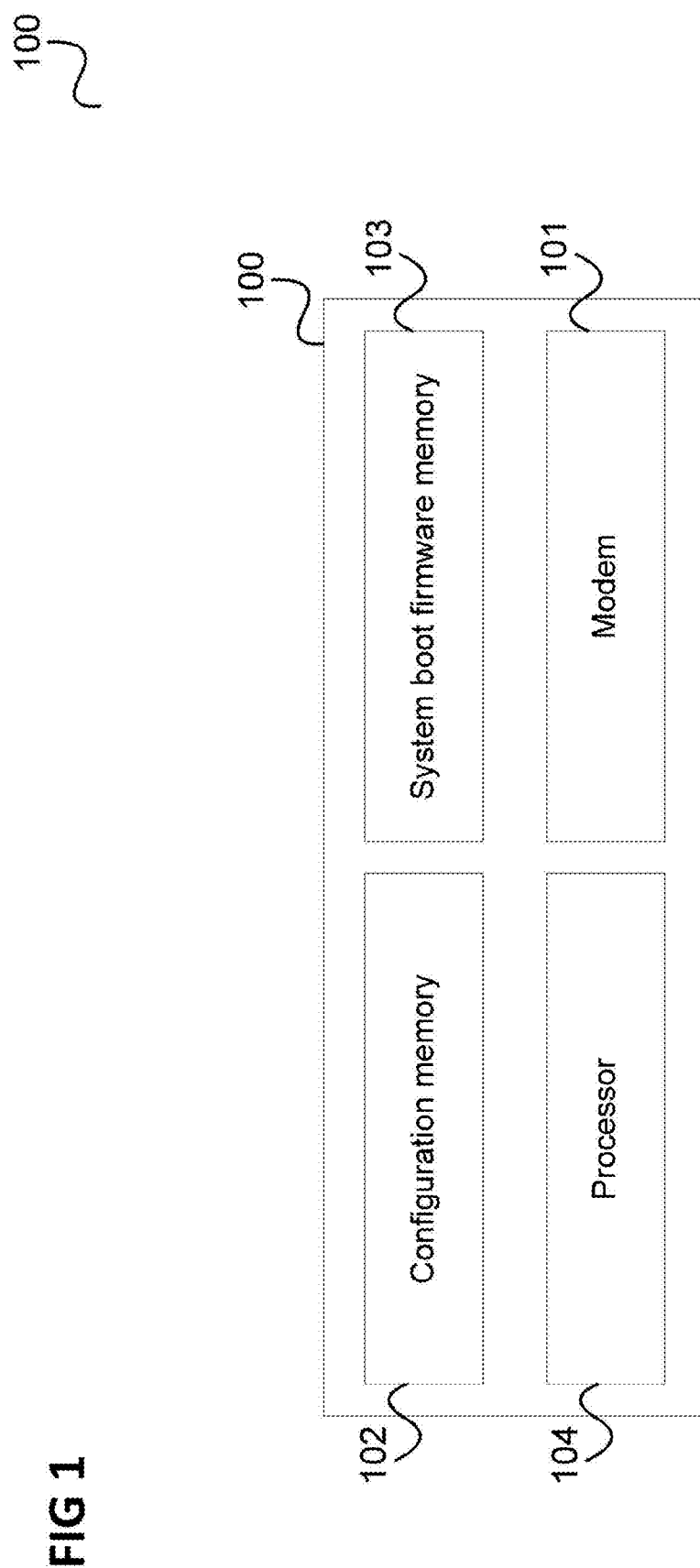
FIG. 1 shows a communication terminal.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

A modem of a communication terminal may or not be equipped with a memory (e.g. a flash memory) to store modem configuration data, such as the modem's firmware or modem calibration data. For example, for the Android operating system (OS), a flashless modem design may be used which, due to the need of storing the configuration data in the modem after power-up of the communication terminal, has a long boot up time. In contrast, for the Windows OS, e.g. due to the Microsoft Logo requirement and limitations from the Windows MBIM (Mobile Broadband Interface Model) in-box driver, a flash-based modem design may be used instead which, however, leads to a higher cost (BOM, Bill of Materials) due to the cost of the flash memory of the communication terminal.

In such a case, to support different modem operations for Windows and Android, due to different modem designs regarding the flash memory, additional hardware switch circuitry may be required and a common platform hardware to support dual OS (Android and Windows) may not be possible.

For example, with regard to calibration data, a communication terminal including a modem (e.g. a mobile phone, a tablet, etc.) is typically provided with calibration data during its manufacturing. However, as mentioned above, for example, for Windows OS a modem with a flash memory may be used while for Android OS a flashless modem (i.e. a modem that does not have a flash memory) may be used. Typically, manufacturers (e.g. OEMs) are trying to have a common cost (BOM) for communication terminals for Windows and Android, deployed with one OS or deployed with dual boot at factory/production level.

For example, different software techniques may be used for Android and Windows system to control the calibration process and write the calibration data to the modem flash memory for a flash-based modem for Windows and to an eMMC (embedded multimedia card) or UFS (universal flash storage) for a flashless modem for Android when providing the communication terminal with calibration data. These software techniques are typically not compatible and may involve the usage of modem calibration files in different formats which delays the manufacturing process. This significantly increases the cost (both with respect to development and BOM) for products that should support dual-boot OS or dual OS or multiple OS.

For example, the following approaches may be used to support both Windows and Android:
1. Calibrate for each OS in a standalone way: store calibration data in the modem flash memory for Windows and store calibration data in a partition of eMMC or UFS owned by the OS for Android. This however requires two calibrations to support dual OS. A calibration for a typical modem takes for example takes 1.5 minutes using expensive modem calibration equipment in the factory. Thus, this adds high cost to manufacturing.
2. Change the calibration tool for the modem to calibrate in flashless mode (in each case) then push the configuration data to the modem. This may however require significant changes in the modem NVM (non-volatile memory) manager. NVM manager kernel files may for example need to be changed to an API format to unify the formats after calibration. In case of modem resets the OS needs to extract the data and download it to the modem for both the NVM data (i.e. calibration data, dynamic and static modem parameters) and the modem firmware (FW). This needs additional software development as well as validation efforts.
3. Use a flash-based modem for both Android and Windows. This allows unifying the data format and the storage. However, changing from a fleshless modem to a flash-based modem means increased cost for a communication device. Further, this may require the support for both flash-based and fleshless solutions for Android in case that it is not possible or desired not all devices are changed from fleshless to flash-based. Due to resource and schedule limitations this may not be possible.

In the following, a communication terminal is described allowing unifying the calibration process across a plurality of operating systems without increasing the BOM cost and leaving freedom to differently handle the calibration for the different OSs and further allowing to reduce boot-up time for the usage of a fleshless modem.

FIG. 1 shows a communication terminal 100.

The communication terminal includes a modem 101, a first memory 102 configured to store configuration data for the modem, a second memory 103 configured to store a system boot firmware and a processor 104 configured to execute the system boot firmware and to read the configuration data from the memory and provide it for the modem under the control of the system boot firmware.

In other words, modem configuration data which may include one or more of the modem firmware, calibration data and static and dynamic operation parameters for the modem, are provided for the modem (e.g. in the modem's DRAM) under the control of the system boot firmware (e.g. the BIOS). This may for example happen before the operating system is loaded after power-up of the communication terminal, e.g. while the communication terminal is still under the control of the system boot firmware. In other words, the system boot firmware includes instructions for the processor such that the processor is controlled to provide the configuration data for the modem during execution of the system boot firmware.

Static operation parameters for example include modem specific parameters, such as crystal temperature and aging parameters, etc. There is also a set of calibration operation parameters which are generated from modem calibration process, such as crystal setting, transmitter power setting, receiver gain settings, etc.

Dynamic operation parameters for example include modem last registered cell information, etc.

For example, configuration data such as the modem firmware image is stored in a dedicated (in other words carved out) eMMC or UFS storage area of the communication terminal. When the communication terminal powers up, before the OS boots up, the system boot firmware (i.e. the terminal's main processor under control of the system boot firmware) uses a boot firmware module or driver to load the USB stack IPC (inter processor communication) and to flash and boot up the modem, i.e. to store the configuration data into the modem and initiate booting of the modem.

A communication terminal may be provided including a modem, a memory configured to store configuration data for the modem and a processing circuit (e.g. a processor) configured read the configuration data from the memory and provide it for the modem (e.g. store it in the modem) in a state between power-up of the communication terminal and start of the operating system of the communication terminal.

As mentioned above, in a fleshless modem implementation for Android, for example based on the modem driver loading the USB IPC and starting the modem flashing and booting, the boot up may be rather slow since the OS typically takes a relatively long time to boot up and only then flashing and booting of the modem is performed. The system boot firmware providing the modem firmware for the modem, e.g. storing it into the modem, thus allows a shorter flashing and booting time for Android. For Windows, for which the in-box MBIM driver does not accommodate the fleshless modem approach (in ACM (adaptive coding and modulation) mode) and which has strict boot up time requirement (2 seconds) the approach described with reference to FIG. 1 allows usage a fleshless modem for Windows since the system boot firmware may store the firmware in the modem before Windows is started.

For the calibration data, redundant storage space for modem calibration may be avoided by using a common storage approach for the calibration data for multiple OSs and a common mechanism to provide the calibration data to the OSs' driver entities. For example, the modem calibration data is stored in a dedicated (carved out) eMMC or UFS storage area which is shared between the OSs and the system boot firmware reads it after power-up and presents it to the OS modem driver via ACPI (Advanced Configuration and Power Interface). Alternatively, the calibration data may be kept as part of the BIOS EFI (Extensible Firmware Interface) variable data storage area, and the OS drivers use the EFI runtime APIs to read or write the calibration data. Both approaches are OS agnostic and can be used for a dual boot scenario or for a single OS with a common hardware BOM cost.

In comparison to approach 1 of the approaches 1 to 3 described above, the number of calibrations can be reduced from two to one in case of two operating systems which allows a significant saving of manufacturing cost. Comparing to approach 2, the development work needed may be reduced which enables much faster time to market for, for example, dual OS products. Compared to approach 3, platform BOM cost can be reduced and the work of the development team work may be reduced. This also allows faster time to market for, for example, dual OS products.

Figure 2:
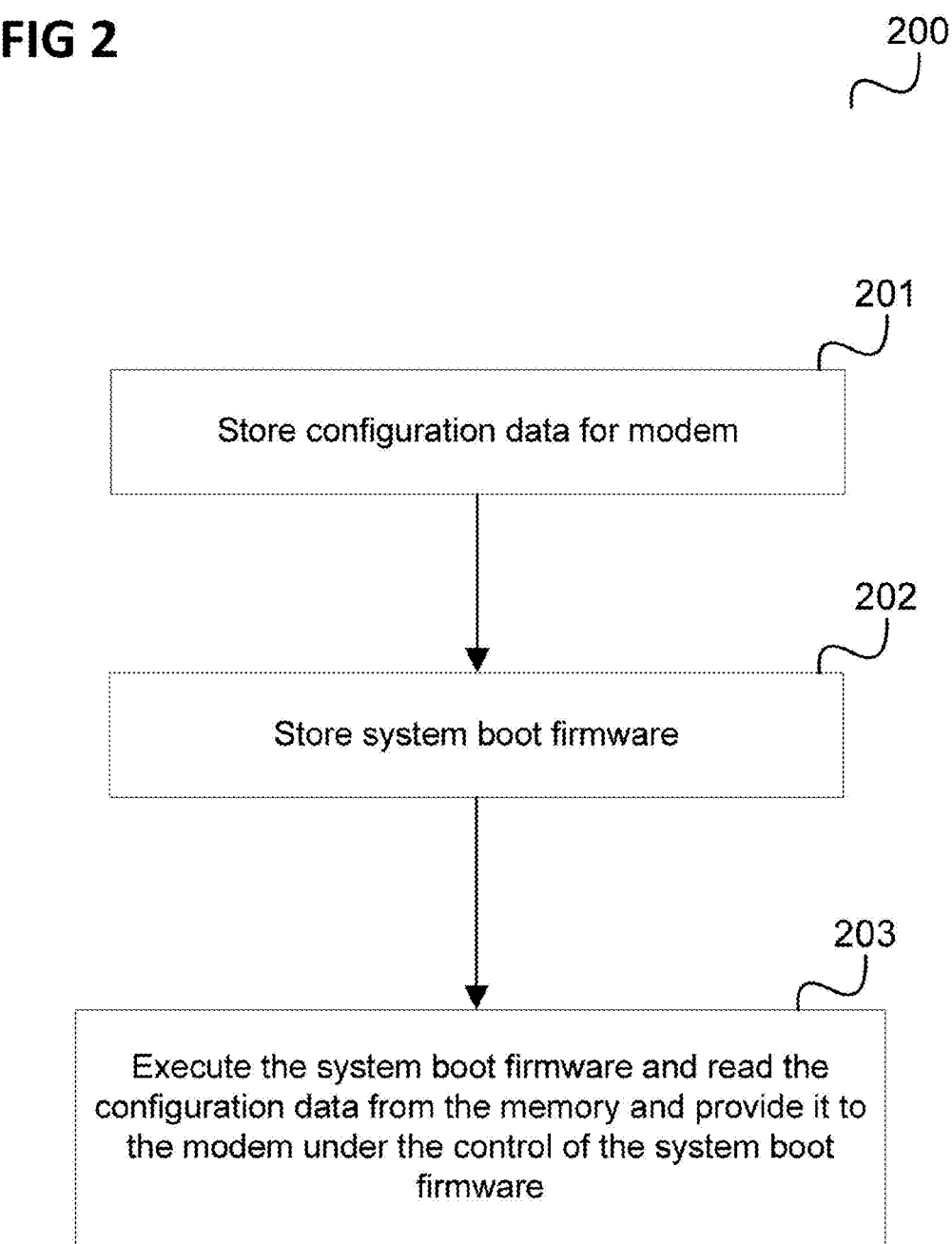
FIG. 2 shows a flow diagram illustrating a method for providing configuration data for a modem.

The communication terminal 100 for example carries out a method as illustrated in FIG. 2.

FIG. 2 shows a flow diagram illustrating a method for providing configuration data for a modem, for example carried out by a communication terminal.

In 201, the communication terminal stores configuration data for the modem.

In 202, the communication terminal stores a system boot firmware.

In 203, the communication terminal executes the system boot firmware reads the configuration data from the memory and providing it to the modem under the control of the system boot firmware.

The following examples pertain to further embodiments.

Example 1 is a communication terminal as described with reference to FIG. 1.

In Example 2, the subject matter of Examples 1 can optionally include a third memory storing an operating system of the communication terminal.

In Example 3, the subject matter of Examples 2 can optionally include the processor being configured to read the configuration data from the memory and provide it for the modem in a state between power-up of the communication terminal and start of the operating system of the communication terminal.

In Example 4, the subject matter of any one of Examples 1-3 can optionally include the processor is configured to read the configuration data and to provide it for the modem in response to the power-up of the communication terminal.

In Example 5, the subject matter of any one of Examples 1-4 can optionally include the processor being configured to store the configuration data in the modem.

In Example 6, the subject matter of any one of Examples 1-5 can optionally include a modem driver, wherein the processor is configured to supply the configuration data to the modem driver.

In Example 7, the subject matter of Examples 6 can optionally include the modem driver being configured to store the configuration data in the modem.

In Example 8, the subject matter of any one of Examples 6-7 can optionally include the modem driver being a modem driver of an operating system of the communication terminal.

In Example 9, the subject matter of any one of Examples 1-8 can optionally include the processor being configured to store the configuration data in a volatile memory.

In Example 10, the subject matter of Examples 9 can optionally include the processor being configured to store the configuration data in a volatile memory of the modem.

In Example 11, the subject matter of any one of Examples 9-10 can optionally include the processor being configured to store the configuration data in a main memory of the communication terminal.

In Example 12, the subject matter of any one of Examples 1-11 can optionally include the configuration data comprising a firmware of the modem.

In Example 13, the subject matter of any one of Examples 1-12 can optionally include the configuration data comprising calibration data for the modem.

In Example 14, the subject matter of any one of Examples 1-13 can optionally include the configuration data including at least one of static and dynamic operation parameters for the modem.

In Example 15, the subject matter of any one of Examples 1-14 can optionally include at least one of the first memory and the second memory being a non-volatile memory.

In Example 16, the subject matter of any one of Examples 1-15 can optionally include the first memory being a multimedia card.

In Example 17, the subject matter of any one of Examples 1-16 can optionally include at least one of the first memory and the second memory being a ROM.

In Example 18, the subject matter of any one of Examples 1-17 can optionally include the processor being an application processor of the communication terminal.

In Example 19, the subject matter of any one of Examples 1-18 can optionally be a mobile communication terminal.

In Example 20, the subject matter of any one of Examples 1-19 can optionally be a mobile phone or a tablet computer.

Example 21 is a method for providing configuration data for a modem as described with reference to FIG. 2.

In Example 22, the subject matter of any one of Examples 21 can optionally include storing a operating system.

In Example 23, the subject matter of any one of Examples 22, comprising reading the configuration data from the memory and providing it for the modem in a state between power-up of the communication terminal and start of the operating system.

In Example 24, the subject matter of any one of Examples 21-23 may optionally include reading the configuration data and providing it for the modem in response to the power-up of the communication terminal.

In Example 25, the subject matter of any one of Examples 21-24 may optionally include storing the configuration data in the modem.

In Example 26, the subject matter of any one of Examples 21-25 may optionally include supplying the configuration data to a modem driver.

In Example 27, the subject matter of Examples 26 may optionally include the modem driver storing the configuration data in the modem.

In Example 28, the subject matter of any one of Examples 26-27 may optionally include the modem driver being a modem driver of an operating system.

In Example 29, the subject matter of any one of Examples 21-28 may optionally include storing the configuration data in a volatile memory.

In Example 30, the subject matter of Examples 29 may optionally include storing the configuration data in a volatile memory of the modem.

In Example 31, the subject matter of any one of Examples 29-30 may optionally include storing the configuration data in a main memory of the method.

In Example 32, the subject matter of any one of Examples 21-31 may optionally include the configuration data comprising a firmware of the modem.

In Example 33, the subject matter of any one of Examples 21-32 may optionally include the configuration data comprising calibration data for the modem.

In Example 34, the subject matter of any one of Examples 21-33 may optionally include the configuration data including at least one of static and dynamic operation parameters for the modem.

In Example 35, the subject matter of any one of Examples 21-34 may optionally include storing at least one of the configuration data and the system boot firmware in a non-volatile memory.

In Example 36, the subject matter of any one of Examples 21-35 may optionally include storing the configuration data in a multimedia card.

In Example 37, the subject matter of any one of Examples 21-38 may optionally include storing at least one of the configuration data and the system boot firmware in a ROM.

In Example 38, the subject matter of any one of Examples 21-37 may optionally include an application processor executing the system boot firmware and reading the configuration data from the memory and providing it to the modem under the control of the system boot firmware.

In Example 39, the subject matter of any one of Examples 21-38 may optionally be performed by a communication terminal.

In Example 40, the subject matter of any one of Examples 21-39 may optionally be performed by a mobile phone or a tablet computer.

Example 41 is a computer readable medium having recorded instructions thereon which, when executed by a processor, make the processor perform a method for performing radio communication according to any one of claims Examples 21 to 40.

Example 42 is a communication terminal comprising a modem; a means for storing configuration data for the modem; a means for storing a system boot firmware; and a means for executing the system boot firmware and for reading the configuration data from the memory and for providing it for the modem under the control of the system boot firmware.

In Example 43, the subject matter of Examples 42 may optionally include a means for storing an operating system of the communication terminal.

In Example 44, the subject matter of any one of Examples 42-43 may optionally include the means for executing the system boot firmware being for reading the configuration data from the memory and for providing it for the modem in a state between power-up of the communication terminal and start of the operating system of the communication terminal.

In Example 45, the subject matter of any one of Examples 42-44 may optionally include the means for executing the system boot firmware being for reading the configuration data and for providing it for the modem in response to the power-up of the communication terminal.

In Example 46, the subject matter of any one of Examples 42-45 may optionally include the means for executing the system boot firmware being for storing the configuration data in the modem.

In Example 47, the subject matter of any one of Examples 42-46 may optionally include a means for driving the modem, wherein the means for executing the system boot firmware is for supplying the configuration data to the means for driving the modem.

In Example 48, the subject matter of Examples 47 may optionally include the means for driving the modem being for storing the configuration data in the modem.

In Example 49, the subject matter of any one of Examples 47-48 may optionally include the means for driving the modem being a modem driver of an operating system of the communication terminal.

In Example 50, the subject matter of any one of Examples 42-49 may optionally include the means for executing the system boot firmware being for storing the configuration data in a volatile memory.

In Example 51, the subject matter of Example 50 may optionally include the means for executing the system boot firmware being for storing the configuration data in a volatile memory of the modem.

In Example 52, the subject matter of any one of Examples 50-51 may optionally include the means for executing the system boot firmware being for storing the configuration data in a main memory of the communication terminal.

In Example 53, the subject matter of any one of Examples 42-52 may optionally include the configuration data comprising a firmware of the modem.

In Example 54, the subject matter of any one of Examples 42-53 may optionally include the configuration data comprising calibration data for the modem.

In Example 55, the subject matter of any one of Examples 42-54 may optionally include the configuration data including at least one of static and dynamic operation parameters for the modem.

In Example 56, the subject matter of any one of Examples 42-55 may optionally include at least one of the means for storing the configuration data and the means for storing the system boot firmware being a non-volatile memory.

In Example 57, the subject matter of any one of Examples 42-56 may optionally include the means for storing the configuration data being a multimedia card.

In Example 58, the subject matter of any one of Examples 42-57 may optionally include at least one of the means for storing the configuration data and the means for storing the system boot firmware being a ROM.

In Example 59, the subject matter of any one of Examples 42-58 may optionally include the means for executing the system boot firmware being an application processor of the communication terminal.

In Example 60, the subject matter of any one of Examples 42-59 may optionally be a mobile communication terminal.

In Example 61, the subject matter of any one of Examples 42-60 may optionally be a mobile phone or a tablet computer.

It should be noted that one or more of the features of any of the examples above may be combined with any one of the other examples.

In the following, examples are described in more detail with reference to FIG. 3. Although the following examples are explained with Android and/or Windows as examples for operating systems, any other operating system such as Linux, iOS, Blackberry etc. may also be used.

Figure 3:
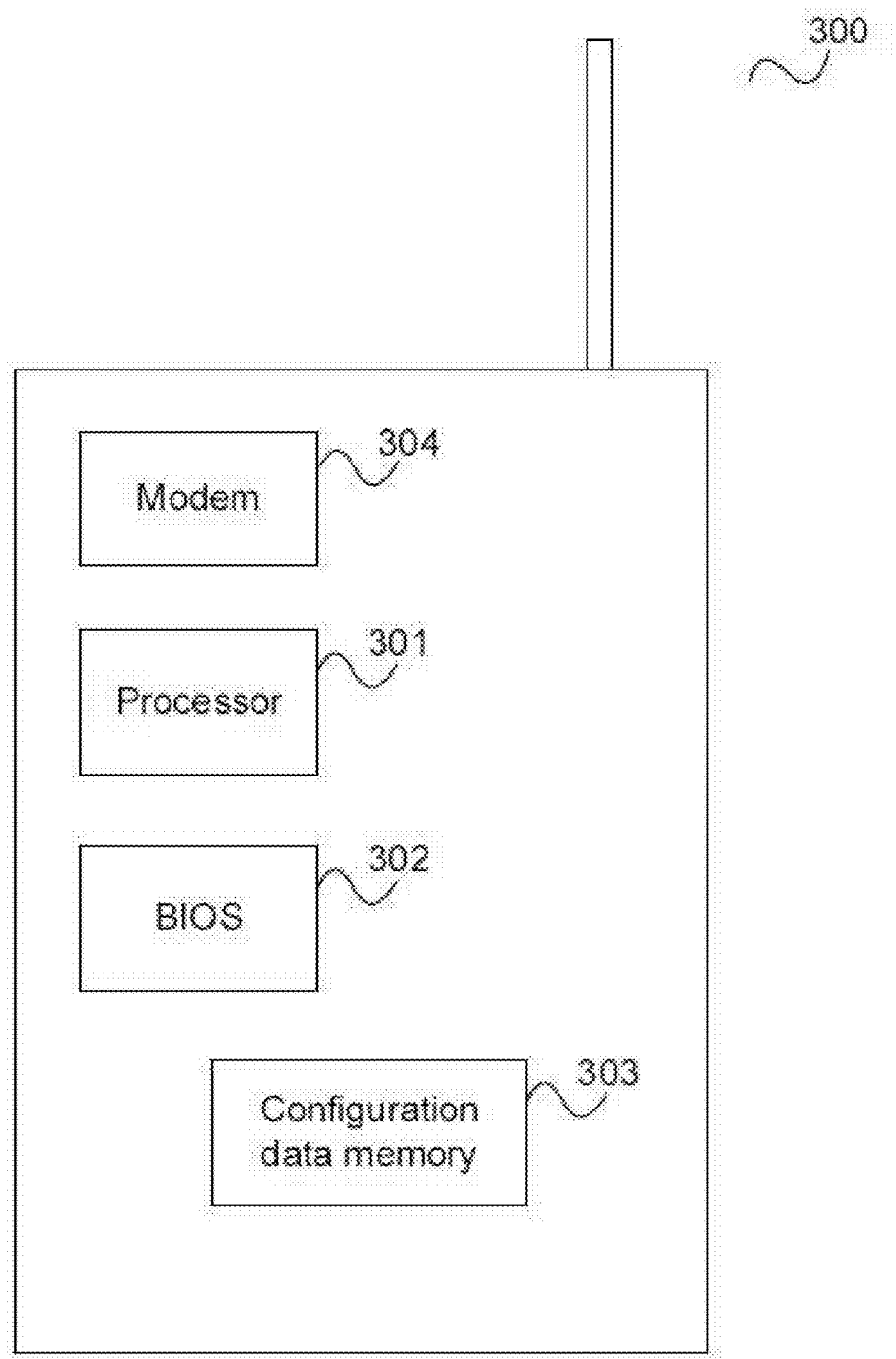
FIG. 3 shows an example for a mobile phone.

FIG. 3 shows a mobile phone 300.

The mobile phone 300 includes an application processor 301, a BIOS (ROM) memory 302 (as an example for a system boot firmware memory), a modem configuration data memory 303 and a modem 304. The mobile phone includes further typical mobile phone equipment such as one or more antennas, a display etc.

Figure 4:
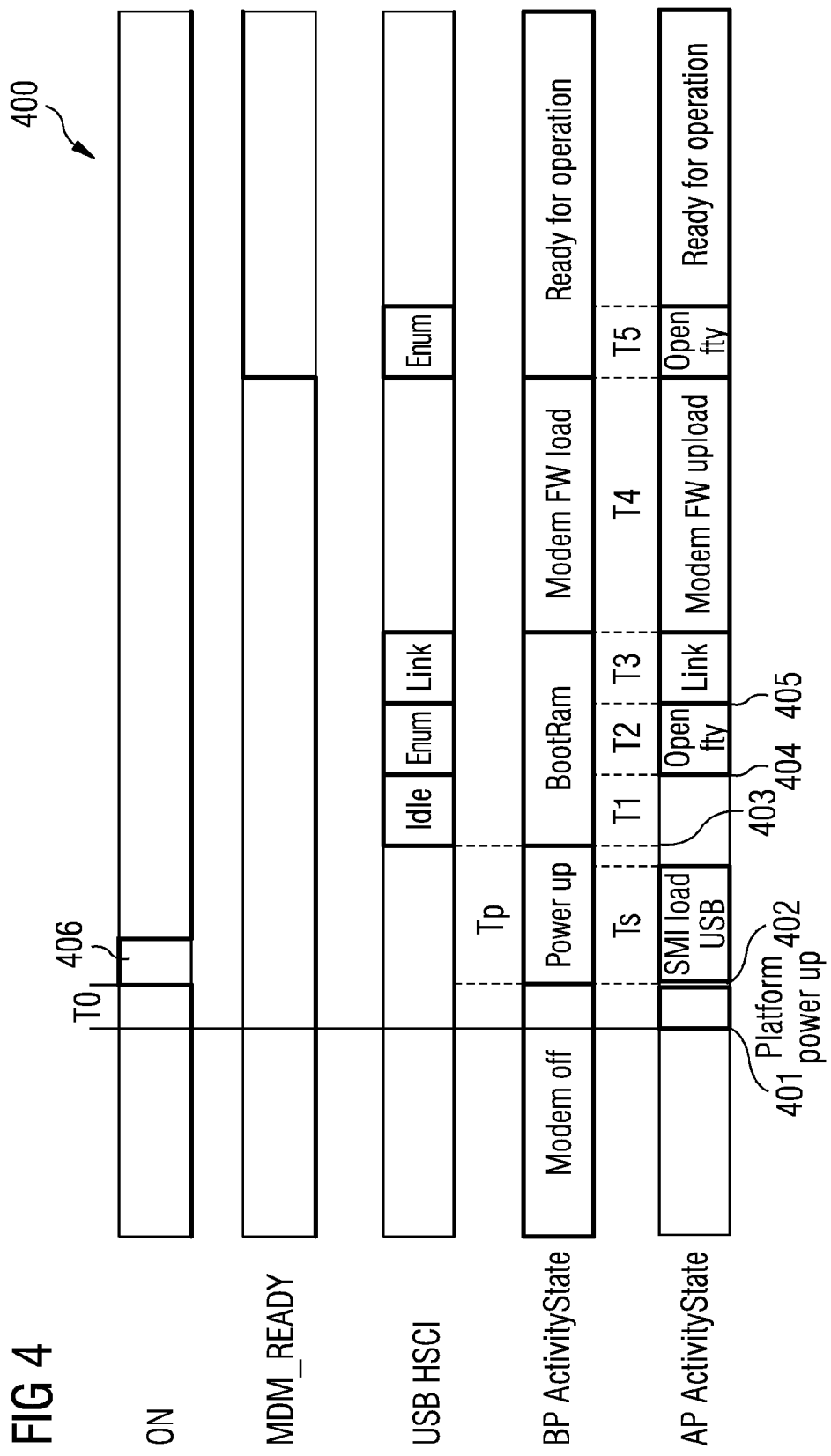
FIG. 4 shows a flow diagram illustrating an example for a flow at power-up of the mobile phone.

FIG. 4 shows a flow diagram 400 illustrating an example for a flow at power-up of the mobile phone 300.

Time runs from left to right in FIG. 4.

At a first point in time 401, the platform (i.e. the mobile phone) is powered up and the application processor AP (301) starts running the BIOS, i.e. the platform PMIC (power management IC) starts up, the BIOS 302 is running and modem baseband reset signal is asserted high. The powering up is for example completed after a time T0 of 10 ms at a second point in time 402. The mobile phone (ore generally the mobile platform) is then starting power up the modem by asserting the modem ON signal 407 at the second point in time of 402 and its end. The processor 301 executes BIOS 302 and, following the second point in time, asserts the MODEM_POWER_ON signal. In this example this signal needs to be asserted for a time Tp 50 ms to stabilize the modem PMU (power management unit). After the time Tp, at a third point in time 403, the modem boot ROM to starts up, i.e. the modem starts executing its boot ROM−Tp=50 ms.

Further, at the second point in time 402, the BIOS uses an SMI to enter SMM and to loads the USB driver, e.g. onto the SOC (system on chip). This is finished after Ts≤50 ms.

At a fourth point in time, after a time T1≤150 ms following the third point in time, there is the HSIC (High Speed Inter Chip) idle timeout (set at Boot ROM and determined by the SOC).

At a fifth point in time 405, after a time T2≤500 ms following the fourth point in time, the HSIC enumeration time (given by the ACM and determined by the SOC).

Then, the modem loads the flashloader and starts to receive the PSI (primary signed image), EBL (external boot loader) and FW (firmware) image. This requires a period of T4≈1 s.

The OS is started at the end of T4 and the OS or the user can use the modem at a sixth point in time 406.

Figure 5:
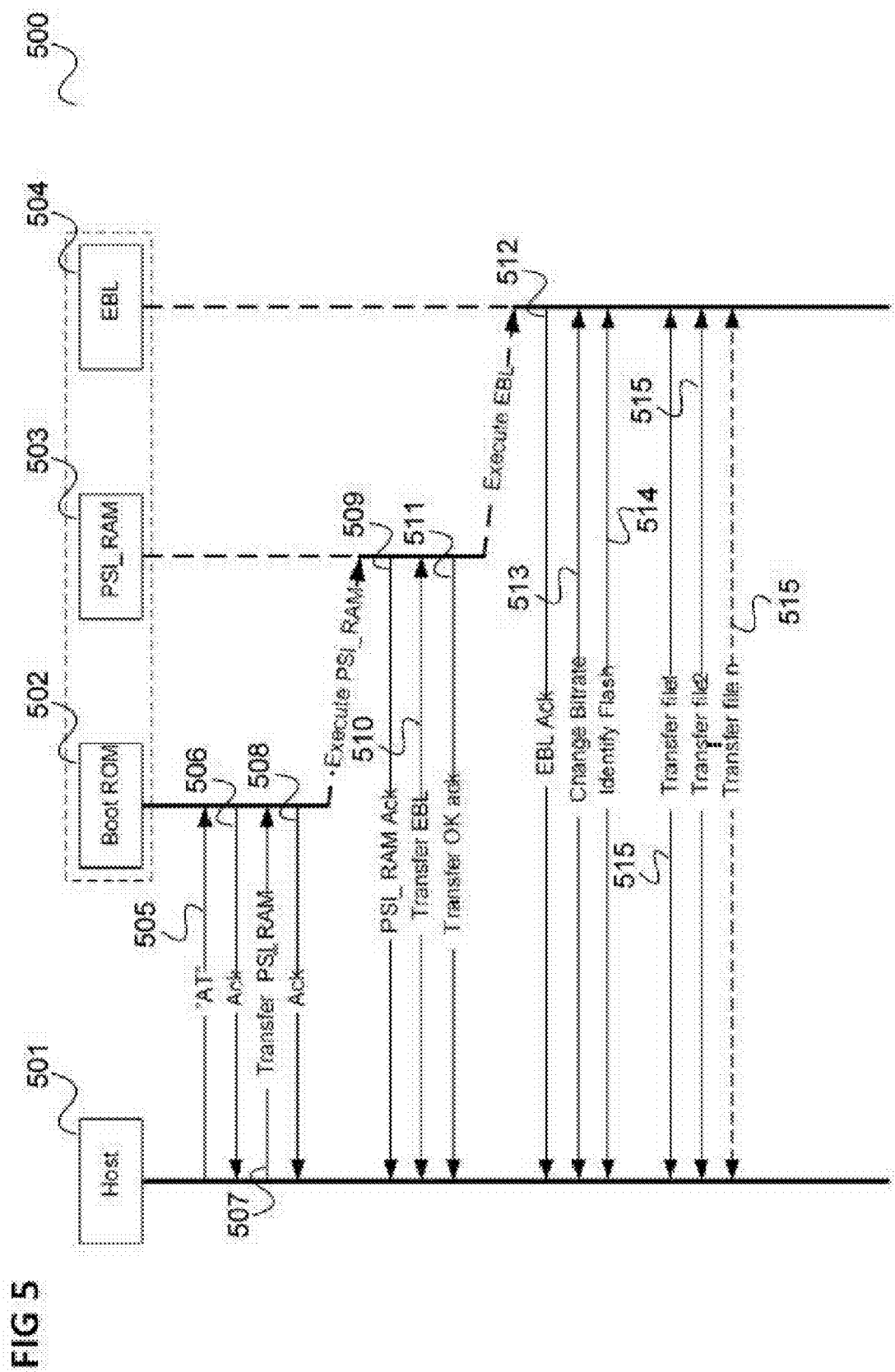
FIG. 5 shows a message flow diagram for a firmware transfer to a modem.

The transfer of PSI, EBL and firmware image files is illustrated in FIG. 5.

FIG. 5 shows a message flow diagram 500.

The message flow takes place between a host 501 (i.e. the host of the firmware), e.g. corresponding to the application processor 301 under control of the BIOS 302 and a modem corresponding to modem 304 including a boot ROM 502 and eventually a PSI 503 (which is initially not present in the modem) and an extended boot loader 504 (which is initially not present in the modem).

In 505, the host 501 sends a stream of "ATAT . . . " signal to the modem which the modem would acknowledge in 506. In this way, the modem knows that it would expect the modem firmware download from the host.

In 507, the host transfers the PSI (primary signed image) to the modem which the modem acknowledges in 508.

The modem performs 505, 506, 507, 508 in accordance with the boot ROM, i.e. executing the boot ROM code. This is illustrated in FIG. 6.

Figure 6:
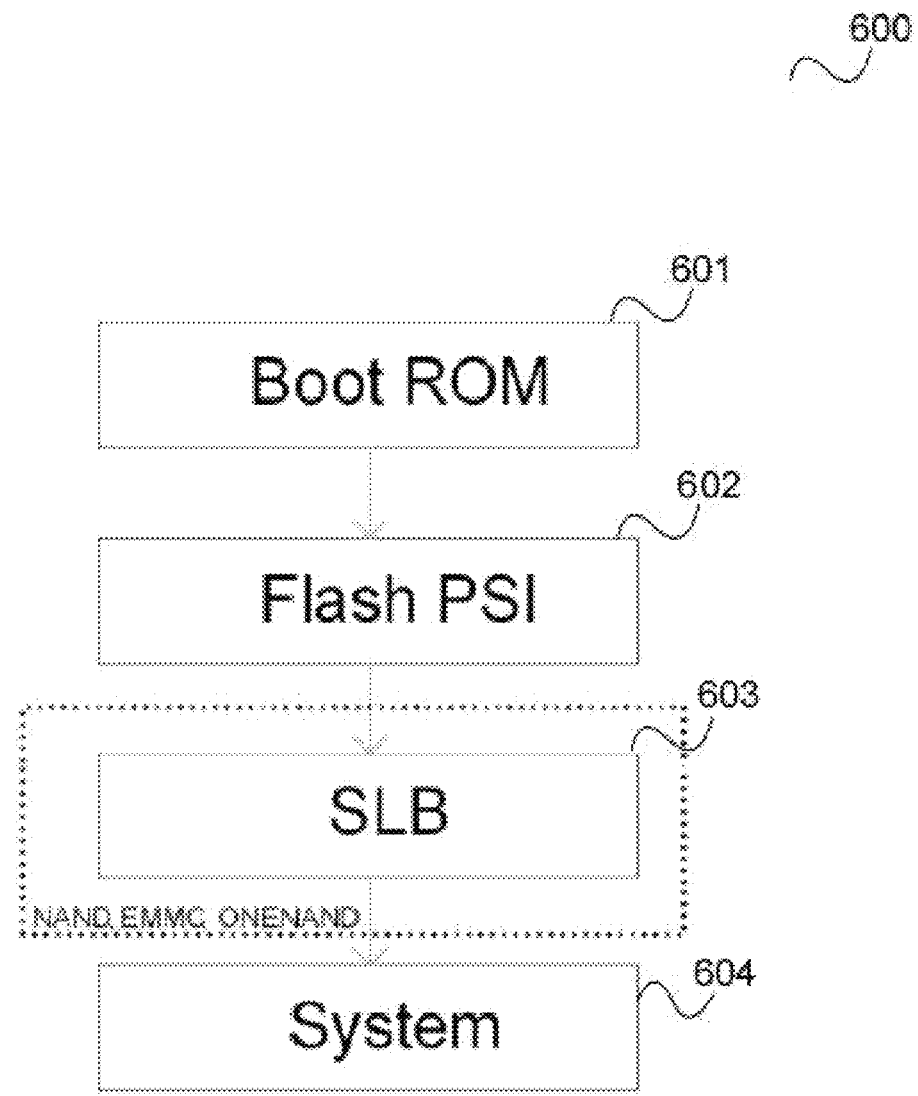
FIG. 6 shows a flow diagram for a firmware transfer to a modem.

FIG. 6 shows a flow diagram 600.

In 601, the modem executes the boot ROM. This corresponds to 505, 506, 507, 508 of FIG. 5.

In 602, the modem executes the PSI code. This includes, as illustrated in FIG. 5, the modem sending a PSI acknowledgement in 509, receiving the EBL from the host 501 in 510 and, assuming a successful transfer of EBL, acknowledging that the transfer has been successful in 511.

In 603, the modem executes the EBL. This includes, as illustrated in FIG. 5, the modem sending an EBL acknowledgement in 512, the host 501 and the modem changing the transfer bit rate in 513. Further, in 514, after the EBL has been executed successfully, host and modem request and identify the correct final modem firmware image to be downloaded to the modem. After this identification process, the final modem firmware is downloaded.

In 604, the modem transfers the firmware. This for example includes, as illustrated in FIG. 5, transfers of files 1 to n in various transfers in 515.

Summing up the total modem flashing and boot-up time gives:

$$T0+Tp+T1+T2+T4+T5=10+50+150+500+1000+500\approx 2.21 \text{ s}.$$

It should be noted that the time T3 omitted in the above formula is the actual link time. It is already counted with 1 second time for the PSI/EBL/FW loading process time. The last 500 ms (T5) is the time modem takes to boot up as MBIM device.

Windows and Android take some time to boot up starting from the platform power up. Windows, for example, takes two seconds to boot up, then it takes around one second for the USB MBIM driver to be ready for modem. So there is three second total time from pushing the power button of the device to the MBIM USB driver to be ready for the modem. By this time (three seconds), according to the above formula, the modem is already flashed (2.21 seconds) and booted up ready for the OS.

In the following, an example is given for a storage of calibration data in a communication terminal, e.g. a mobile device, and the provision of the calibration data to the modem by means of the BIOS.

Figure 7:
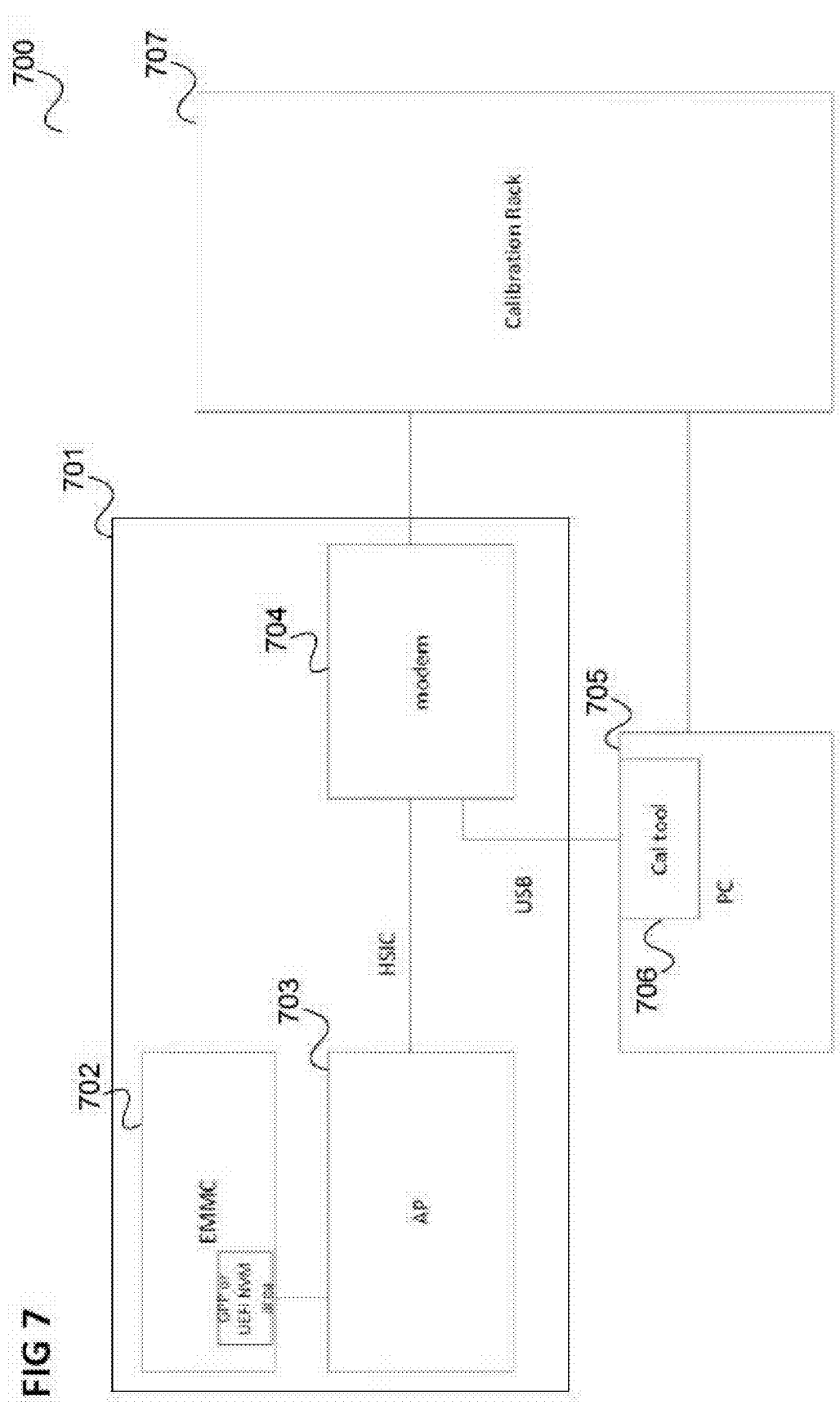
FIG. 7 shows an arrangement for storing the calibration data on the mobile device.

FIG. 7 shows an arrangement 700 for storing the calibration data on the mobile device.

The arrangement 700 includes a mobile device 701 including an eMMC 702, an application processor (AP) 703 and a modem 704. Further, the arrangement includes a PC 705 with a calibration tool 706 and a calibration rack 707.

In factory calibration, the modem 704 is controlled by the PC 705 which controls the modem calibration (via the modem calibration tool 706) in the environment of the respective operating system, e.g. Android. The modem receives the calibration data and pushes it via an HSIC interface to the AP 703. The OS captures the data and pushes it to a GPP (general purpose partition) or a UEFI NVM area in the eMMC (or UFS) 702.

Various approaches may be used for storing the calibration data. For example, a first approach is to store the calibration data in a common EMMC (or UFS) GPP area and a second approach is to store the calibration as part of the UEFI variable area.

The manufacturing phase then ends and the calibration data is stored in the eMMC/UFS/UEFI NVM. When the product has been shipped to the end user, the calibration data is provided by the BIOS during boot up and presented to the driver.

Figure 8:
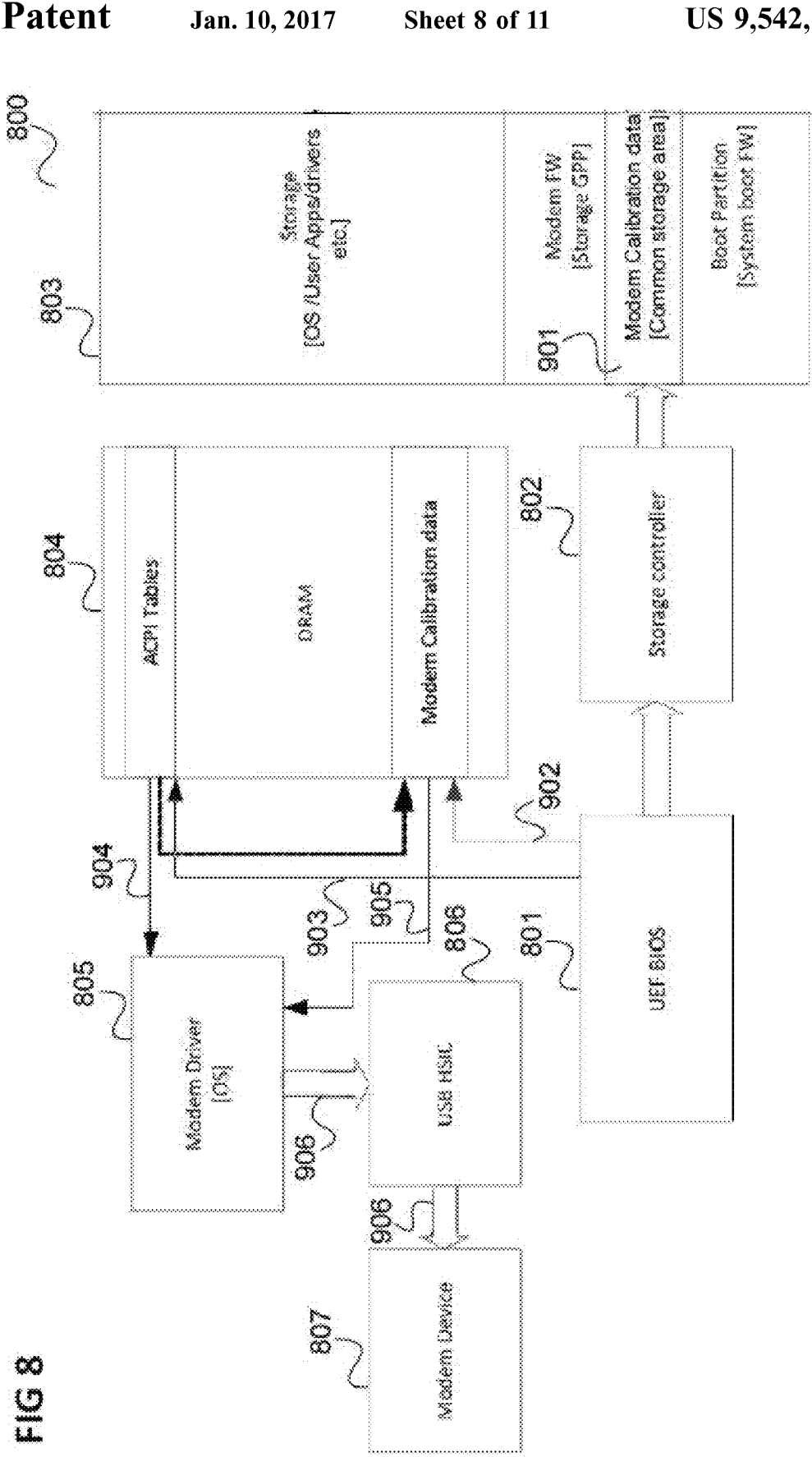
FIG. 8 shows components of a mobile device for provision of the calibration data to the data for the first approach of storing the calibration data.

FIG. 8 shows components of a mobile device for provision of the calibration data to the data for the first approach of storing the calibration data.

The components include the BIOS 801 (a UEF or UEFI BIOS in this example), a storage controller 802, the eMMC 803, a mobile device DRAM 804, the modem driver 805 of the operating system, the USB HSIC 806 and the modem 807.

Figure 9:
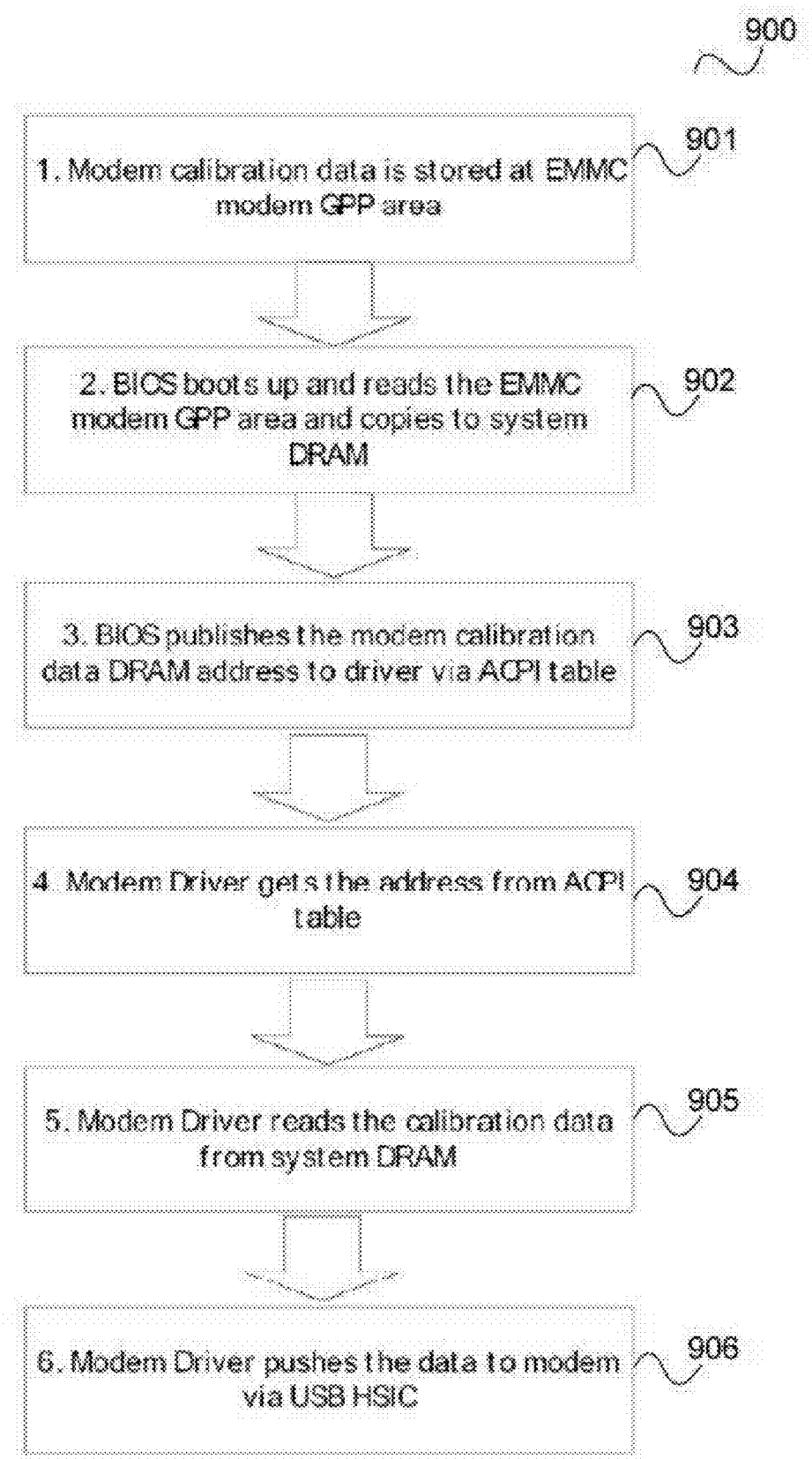
FIG. 9 shows a flow diagram illustrating the system boot up flow for the first approach.

FIG. 9 shows a flow diagram illustrating the system boot up flow.

It is assumed that in 901, as explained with reference to FIG. 7, the modem calibration data is stored in the GPP area of the eMMC 803.

In 902, BIOS boots up and reads the EMMC modem GPP area and copies the calibration data to the system DRAM 804 at a certain DRAM address.

In 903, the BIOS publishes the modem calibration data DRAM address to the driver 805 via the ACPI table.

In 904, the driver 805 gets the modem calibration DRAM address from the ACPI table.

In 905, the driver 805 reads the calibration data from the system DRAM 804.

In 906, the driver 805 pushes the calibration data to the modem 807 via the USB HSIC.

The operations of 901 to 906 are also indicated in FIG. 8 by these reference numerals.

Figure 10:
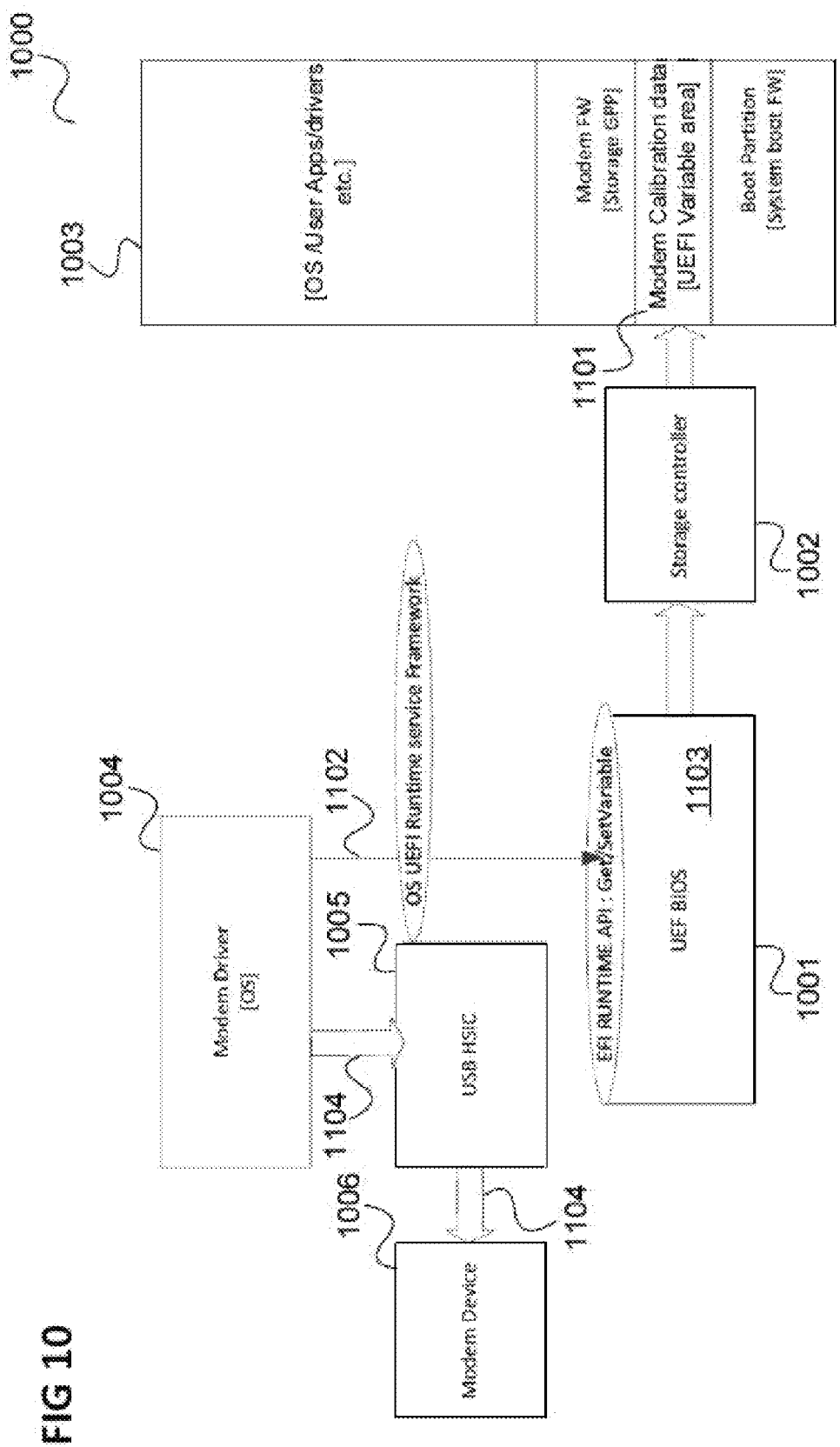
FIG. 10 shows components of a mobile device for provision of the calibration data to the data for the second approach of storing the calibration data.

FIG. 10 shows components of a mobile device for provision of the calibration data to the data for the second approach of storing the calibration data, i.e. the calibration data is kept as part of the BIOS EFI variable data store area, and the OS modem driver uses the EFI runtime APIs to read/write the calibration data.

The components include the BIOS 1001 (a UEF or UEFI BIOS in this example), a storage controller 1002, the eMMC 1003, the modem driver 1004 of the operating system, the USB HSIC 1005 and the modem 1006.

Figure 11:
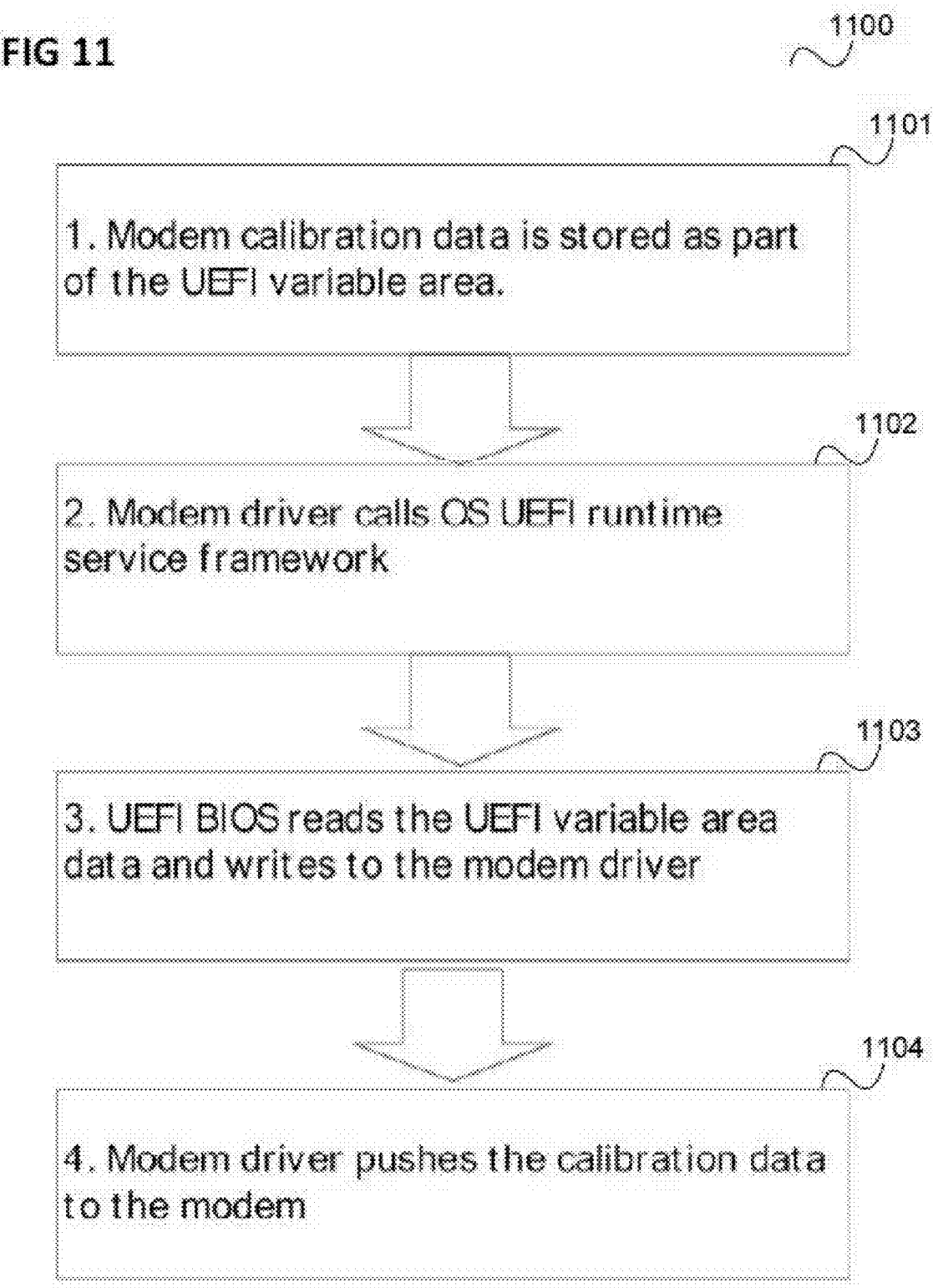
FIG. 11 shows a flow diagram illustrating the system boot up flow for the second approach.

FIG. 11 shows a flow diagram illustrating the system boot up flow.

It is assumed that in 1101, as explained with reference to FIG. 7, that the modem calibration data is stored as part of the UEFI variable area.

In 1102, the modem driver calls the OS UEFI runtime service framework.

In 1103, the BIOS reads the UEFI variable area data and writes it to the modem driver 1004.

In 1104, the modem driver 1104 pushes the calibration data to the modem.

The operations of 1101 to 1104 are also indicated in FIG. 10 by these reference numerals.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication terminal comprising
a modem;
an application processor external to the modem;
a first memory configured to store configuration data for the modem; and
a second memory configured to store a system boot firmware for the application processor,
the application processor configured to;
execute the system boot firmware as part of a boot service;
while under the control of the system boot firmware, read the configuration data from the first memory and to store the configuration data in a temporary memory prior to initialization of a modem driver for the modem; and after completion of the boot service, execute the modem driver to retrieve the configuration data from the temporary memory and provide the configuration data to the modem.

2. The communication terminal of claim 1, comprising a third memory storing an operating system of the application processor.

3. The communication terminal of claim 2, wherein the processor is configured to read the configuration data from the first memory and store the configuration data in the temporary memory in a state between power-up of the communication terminal and start of the operating system of the communication terminal.

4. The communication terminal of claim 1, wherein the application processor is configured to execute the modem driver to retrieve the configuration data from the temporary memory after completing execution of the system boot firmware.

5. The communication terminal of claim 1, wherein the temporary memory is a volatile memory.

6. The communication terminal of claim 1, wherein the configuration data comprises calibration data for the modem.

7. The communication terminal of claim 1, wherein the configuration data includes at least one of static and dynamic operation parameters for the modem.

8. The communication terminal of claim 1, wherein at least one of the first memory and the second memory is a non-volatile memory.

9. The communication terminal of claim 1, wherein the first memory is a multimedia card.

10. The communication terminal of claim 1, wherein at least one of the first memory and the second memory is a ROM.

11. The communication terminal of claim 1, wherein the system boot firmware is a Basic Input Output System (BIOS) boot firmware or a Unified Extensible Firmware (UEFI) boot firmware.

12. A communication terminal comprising
a modem;
an application processor external to the modem;
a first memory configured to store configuration data for the modem; and
a second memory configured to store a firmware interface for the application processor,
the application processor configured to:
execute a system boot service of the firmware interface;
after completion of the system boot service, execute a modem driver for the modem to call a runtime service of the firmware interface;
while under the control of the runtime service, retrieve the configuration data from the first memory; and
execute the modem driver to provide the configuration data to the modem after completion of the runtime service.

13. The communication terminal of claim 12, wherein the first memory is configured to store the configuration data for the modem in a memory partition dedicated to the runtime service.

14. The communication terminal device of claim 12, wherein the firmware interface is a Unified Extensible Firmware Interface (UEFI) and the runtime service is a UEFI Runtime Service.

15. A communication terminal comprising
a modem;
an application processor external to the modem;
a first memory configured to store a firmware image for the modem; and
a second memory configured to store a system boot firmware for the application processor,
the application processor configured to:
execute the system boot firmware;
while under the control of the system boot firmware, read the firmware image from the first memory;
provide the firmware image to the modem prior to initializing a runtime operating system of the application processor; and
initialize the runtime operating system and execute a modem driver of the runtime operating system after providing the firmware image to the modem.

16. The communication terminal of claim 15, wherein the system boot firmware is a Basic Input Output System (BIOS) boot firmware, BIOS runtime firmware, a Unified Extensible Firmware (UEFI) boot firmware, or a UEFI boot firmware.

17. The communication terminal of claim 15, wherein the application processor is configured to initiate, while under the control of the system boot firmware, an inter processor communication (IPC) interface with the modem, and further configured to provide the firmware image to the modem by providing the firmware image with the IPC interface to the modem.

18. The communication terminal device of claim 15, wherein the modem is a flashless modem.

* * * * *

UNITED STATES PATENT AND TRADEMARK OFFICE
CERTIFICATE OF CORRECTION

PATENT NO. : 9,542,196 B2  
APPLICATION NO. : 14/192917  
DATED : January 10, 2017  
INVENTOR(S) : Andrew Zhang et al.

Page 1 of 1

It is certified that error appears in the above-identified patent and that said Letters Patent is hereby corrected as shown below:

In the Specification

Column 2, Line 65, Column 3, Lines 1, 3, 10, 57, and 67, and Column 4, Line 3: delete "fleshless" and insert --flashless-- in place thereof.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*